US009106372B2

(12) United States Patent
Agarwal et al.

(10) Patent No.: US 9,106,372 B2
(45) Date of Patent: Aug. 11, 2015

(54) WIRELESS COMMUNICATION SYSTEM AND NETWORK COMPRISING A FIRST COMMUNICATIONS APPARATUS AND A SECOND COMMUNICATIONS APPARATUS WHICH COMMUNICATES WITH THE FIRST COMMUNICATIONS APPARATUS

(75) Inventors: Rajni Agarwal, Harrow (GB); Kevin Power, West Drayton (GB)

(73) Assignee: FUJITSU LIMITED, Kawasaki (JP)

( * ) Notice: Subject to any disclaimer, the term of this patent is extended or adjusted under 35 U.S.C. 154(b) by 549 days.

(21) Appl. No.: 13/349,048

(22) Filed: Jan. 12, 2012

(65) Prior Publication Data

US 2012/0106486 A1    May 3, 2012

Related U.S. Application Data

(63) Continuation of application No. 12/506,911, filed on Jul. 21, 2009, now Pat. No. 8,125,972.

(30) Foreign Application Priority Data

Aug. 13, 2008    (EP) ..................................... 08162285

(51) Int. Cl.
*H04B 7/208*    (2006.01)
*H04L 1/00*    (2006.01)

(52) U.S. Cl.
CPC .............. *H04L 1/0026* (2013.01); *H04L 1/003* (2013.01); *H04L 1/0027* (2013.01)

(58) Field of Classification Search
CPC ..... H04L 1/0026; H04L 1/0027; H04L 1/003; H04L 1/0071
USPC .................................. 370/208, 281, 319, 344
See application file for complete search history.

(56) References Cited

U.S. PATENT DOCUMENTS

2007/0047502 A1    3/2007  Marinier et al.
2007/0207810 A1*   9/2007  Cho et al. ...................... 455/450
(Continued)

FOREIGN PATENT DOCUMENTS

CN    101133615    2/2008
CN    101213769    7/2008
(Continued)

OTHER PUBLICATIONS

Notification of the First Office Action issued by the State Intellectual Property Office of People's Republic of China for corresponding Chinese Patent Application No. 200910161233.9 issued on Mar. 7, 2012 with English translation.

(Continued)

*Primary Examiner* — Ricky Ngo
*Assistant Examiner* — Wei-Po Kao
(74) *Attorney, Agent, or Firm* — Myers Wolin, LLC

(57) ABSTRACT

A method of requesting a plurality of different characteristic indicators from a second communications apparatus in a wireless communications network including a first communications apparatus and a plurality of such second communications apparatuses which communicate with the first communications apparatus, the method includes the first communications apparatus transmitting a single standing instruction to the second communications apparatus defining at least two interleaving patterns, each interleaving pattern specifying one or more of the characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns.

4 Claims, 16 Drawing Sheets

(56) References Cited

U.S. PATENT DOCUMENTS

2009/0033524 A1* 2/2009 Tiirola et al. .................. 341/51
2009/0034636 A1* 2/2009 Kotecha et al. ............... 375/260
2009/0303900 A1 12/2009 Cho et al.

FOREIGN PATENT DOCUMENTS

| | | |
|---|---|---|
| JP | 2007-525044 | 8/2007 |
| JP | 2009-506642 | 2/2009 |
| WO | 2004077685 | 9/2004 |
| WO | 2007024780 | 3/2007 |

OTHER PUBLICATIONS

Notification of Reasons for Refusal issued for corresponding Japanese Patent Application No. 2009-187431, mailed Dec. 11, 2012, with English translation.
European Search Report and Annex to the European Search Report on European Patent Application No. 08162285.4, dated Mar. 24, 2009.
David Mazzarese, et al., IEEE C802.16m-08/285r2, Broadband Wireless Access Working Group, "Downlink MIMO Schemes for IEEE 802.16m," submitted May 5, 2008 [Ref.: European Search Report, dated Mar. 24, 2009].
Rath Vannithamby, et al., IEEE C802.16m-08/391, Broadband Wireless Access Working Group, "Proposal for IEEE 802.16m CQI Feedback Framework," submitted May 5, 2008 [Ref.: European Search Report, dated Mar. 24, 2009].
Yuefeng Zhou, et al., IEEE C802.16j-07/502r2, Broadband Wireless Access Working Group, "UL Access Zone CQI Reporting in Centralized Scheduling," submitted Sep. 17, 2007 [Ref.: European Search Report, dated Mar. 24, 2009].
IEEE 802.16m-09/0010r1a (working document), Part 16; Air Interface for Fixed and Mobile Broadband Wireless Access Systems, Advanced Air Interface (working document), dated Mar. 2008.
IEEE Standard for Local and metropolitan area networks 802.16e tm-2005 and 6 tm-2004/Cor1-2005, Part 16. Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, Feb. 28, 2006.
United States Patent and Trademark Office "Final Office Action" issued for corresponding U.S. Appl. No. 12/506,911, dated Aug. 18, 2011.
United States Patent and Trademark Office "non-Final Office Action" issued for corresponding U.S. Appl. No. 12/506,911, dated Feb. 1, 2011.
Office Action issued for corresponding Taiwan Patent Application No. 098121176, mailed Apr. 26, 2013, with an English translation.
Samsung Electronics, "Downlink MIMO Schemes for IEEE 802.16m", IEEE C802.16m-08/285r2, May 5, 2008, IEEE 802.16 Broadband Wireless Access Working group <http://ieee802.org/16>.

* cited by examiner

WIRELESS COMMUNICATION SYSTEM AND NETWORK COMPRISING A FIRST COMMUNICATIONS APPARATUS AND A SECOND COMMUNICATIONS APPARATUS WHICH COMMUNICATES WITH THE FIRST COMMUNICATIONS APPARATUS

BACKGROUND

In current OFDMA based wireless communication systems such as IEEE 802.16e-2005, the TDD frame structure shown in FIG. 1 comprises two subframes, one for downlink and the other for uplink. The 802.16e-2005 standard specifies many possible frame durations ranging from 2 ms to 20 ms in length. However, the current WiMAX forum profile (Release 1.0) specifies that only 5 ms frames are used to ensure that all WiMAX forum certified equipment is interoperable. The current standard defines many features which, if combined, may improve the system throughput and ensure that the user experiences the best possible performance. However, in order for the combinations to operate efficiently, the base station (BS) requires knowledge of the propagation channel that the mobile station (MS) experiences. For this reason, the BS allocates the MS with a specific CQICH channel(s) that resides within the CQICH region shown in the uplink subframe in FIG. 1. This allocated CQICH channel is used by the MS to report either physical or effective SINR, one of which will be instructed by the BS. In this case, the MS calculates a channel quality measurement based on the physical or effective CINR which provides information on the actual operating condition of the receiver, including interference and noise levels and signal strength. The information is fed back to the BS via the allocated CQI feedback channel (CQICH) and, as a result, the BS may use the information to manage its radio resources or to perform basic link adaptation for the MS.

Considering the (legacy) IEEE 802.16e-2005 TDD frame structure, the first symbol is occupied by a preamble which is mainly used for synchronisation purposes, but is also used for transmitter identification during network entry and handover procedures. On the second and third symbols following the preamble is the FCH. The FCH is transmitted using a well-known format and provides sufficient information to decode the following MAP message, i.e. the MAP message length, coding scheme and active sub-channels. Following the FCH is the DL-MAP which may be followed by the UL-MAP. These MAP messages provide information on the allocated resource (slots) for traffic and control channels within the frame. These MAPs contain DL-MAP_IEs and UL-MAP_IEs which define bursts within the frames, (i.e. one MAP_IE will be related to one burst within the frame). The information within these MAP_IEs, such as the subchannel offset and symbol offset, is crucial as it is used by the MS to locate the resource within the subframes. For the purposes of the CQICH region, a Fast Feedback IE is transmitted in the UL-MAP which informs the MSs of its location within the UL subframe (i.e. subchannel and symbol offsets). The CQICH region comprises an integer number of slots (one subchannel by three OFDMA symbols), where one slot can be used as a CQICH channel.

The TDD OFDMA frame structure for IEEE 802.16m is illustrated in FIG. 2, which demonstrates how it differs from the legacy frame structure in that a radio frame consists of eight subframes. The 20 ms super frame consists of four equally sized radio frames further comprising eight subframes where each subframe can be allocated to either DL or UL. It may be possible to introduce up to four switching points within one radio frame and, in the context of CQICH feedback, this feature allows for a faster feedback rate if the CQICH BS processing delay is less than four subframes, potentially improving the ability to support accurate link adaptation for high mobility users.

In the current IEEE802.16e-2005 standard, two concurrent CQICH channels can be supported by any MS, where one channel is mainly used for physical CINR reports and the other for effective CINR measurements. It is desirable for the BS to adapt to the best possible physical layer operating mode or efficiently manage its radio resources, employing many features to maximize the system performance such as adaptive MIMO switching, Distributed/Localized switching or FFR, using the two channels per MS. As the radio configuration changes over time for a given MS, a new channel estimation report may be required for the new data zone/subframe/mode in which a data burst may be transmitted (as a result of the physical layer mode change). One solution is to increase the number of available CQICH channels per MS, but this would be at the expense of reducing uplink capacity and thus diminishing the accessible resource for raw data. The BS instructs which type of measurement is to be reported on each CQICH channel via two independent CQICH_Alloc_IEs which will be transmitted within the UL-MAP. These information elements can be sent once to the MS and the MS can periodically (for x frames) report the required measurements on the specified channel indicated by a CQICH_ID.

The BS may instruct the MS to report, for instance, a physical CINR measurement of preamble reuse-1 on the first CQICH channel as this may give the BS enough information from all the MSs to assist the BS in performing a technique known as Fractional Frequency Reuse (FFR). In FFR, the users at the cell/sector edge operate with a fraction of all sub-channels available while the inner cell users operate with all sub-channels available. Usually, the cell edge users are operated with frequency reuse=3 (called R3) while the inner cell users are operated in R1. In frame transmission aspects, the R3 users are grouped into a separate time slot in the frame (called a zone), which is separated in time from the R1 zone. The perceived benefits of FFR lies with the provision of a better signal quality to the cell edge users, through the physical isolation of the interference sources. It is expected that the improved signal quality can also bring higher throughput for the cell edge users. However, this comes at the cost of reduced resource availability.

On the second CQICH channel, the BS may instruct the MS to report an effective CINR measurement (based on pilot or data subcarriers from data block or zone/subframe/mode) as this can be used to perform link adaptation. However, when the MS's preferred zone/subframe/mode changes from R1 to R3 or vice-versa, the MS needs to be instructed to report effective CINR measurement from the new data zone/subframe/mode. This involves additional overhead for de-allocation/re-allocation of the second CQICH channel through the CQICH_Alloc_IE. In addition, it adds to the delay in the availability of correct CQICH measurements for the new data zone/subframe/mode, leading to inaccurate link adaptation. This leads to an increased overhead in the UL-MAP and reduced efficiency in resource management.

FIG. 3 relates to an example of CQICH signaling in the FFR case, where the BS collects all the information required to distribute the users between the Reuse-1 (R1) and Reuse-3 (R3) zones. In this example, it is assumed that a specific MS is allocated in a Reuse-1 zone, and the CQICH channels for this MS are assigned as follows:

CQICH Channel 1 (Physical CINR from Preamble R1)—For zone selection CQICH Channel 2 (Effective CINR from Pilot/Data Subcarriers of R1 zone)—For Link Adaptation The Physical CINR report is used by the BS to switch the MS adaptively between R1 and R3 zones, whereas the Effective CINR report is used for performing link adaptation. In FIG. 3, Channel 1 signaling is indicated by hatched blocks and Channel 2 is indicated by non-hatched blocks.

FIG. 3 highlights the scenario where the BS decides to switch a MS (user) from an R1 zone to an R3 zone, with this being referred to as the Radio Configuration Switch Point. The physical layer operating mode of the MS will now change, with the MS being allocated data within the R3 zone. In this case, the BS sends another CQICH_Alloc_IE (related to Channel 2) to inform the MS to measure and report the Effective CINR for the R3 zone to allow for accurate link adaptation (MCS selection).

SUMMARY

According to a first aspect, there is provided a method of requesting a plurality of different characteristic indicators from a second communications apparatus in a wireless communications network comprising a first communications apparatus and a plurality of such second communications apparatuses which communicate with the first communications apparatus, the method comprising;

the first communications apparatus transmitting a single standing instruction to the second communications apparatus defining at least two interleaving patterns, each interleaving pattern specifying two or more of the characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns.

The wireless communications network (wireless communications system) may comprise any collection of communication apparatuses or nodes which are capable of communicating wirelessly with one another. For example, the wireless communications network may comprise a WiMAX network, based on the IEEE 802.16 standards. In another example, the wireless communications network may comprise a telecommunications network, for example a 3G network.

A communications apparatus may comprise a network station or subscriber station, for example, or a part thereof. A communications apparatus may comprise any transmitter circuitry, receiver circuitry and control circuitry necessary to perform its functions. A network station may comprise any apparatus which serves directly or indirectly to control access by other stations to network resources, which may include, for example, permitting access to the resources, allocating bandwidth, monitoring connections, and so on. A network station may comprise, for example, a base station (BS) or a relay station (RS). A subscriber station (SS) may comprise any apparatus which is used by a user to access network resources. The subscriber station may or may not be portable, and may be intended for location indoors or outdoors. Examples of subscriber stations may include handsets, mobile telephones, smartphones, PC peripherals or components, consumer electronics devices, game terminals and mp3 players. The subscriber station may comprise a mobile station (MS) or user equipment, for example. It is to be understood that the terms SS and MS are used interchangeably, and that the term MS when used does not limit the invention to stations which are mobile.

A characteristic indicator may comprise any information relating to the radio environment or radio configuration, and in particular may relate to channel conditions or channel quality. For example, the characteristic indicator may relate to, or be useful for the purposes of, link adaptation, physical layer mode adaptation or mode switching. Such indicators of characteristic properties may be sent from mobile stations (MSs) and relay stations (RSs) towards the base station (BS) in the wireless communication network. The indicators or reports can be used to provide information on the uplink relating to the MS or RS, and/or its environment or requirements. For instance, the indicators may relate to bandwidth requirements, the type of service required or channel parameters such as channel quality. In one specific example, an indicator provides a measure of the channel quality between the base station and relay or mobile station concerned. Of course if there are relays involved in the transmission path, the indicators can be used by a relay station to determine the channel quality or other indicator in the previous link from another relay station or from a mobile station. Such reports can be used to identify changes needed in transmission parameters to maximise use of resources while retaining acceptable service for the user of the system. The characteristic indicator may be a feedback report, for example a CQI (channel quality indicator) report. In particular examples, a characteristic indicator may comprise one or more of a physical CINR report and an effective CINR report. A physical CINR report may be taken from a preamble of for example an R1 zone, or an R3 zone. An effective CINR report may be taken from pilot/data subcarriers of for example an R1 or R3 zone. These reports may be referred to as P-CINR R1, P-CINR R3, E-CINR R1, and E-CINR R3. At least one of the characteristic indicators may be a characteristic indicator which is not used for assessing transmission at the time when the method commences.

As an example, if an MS is presently operating in a first zone within a WiMAX frame, one of the characteristic indicators may provide information relating to parameters (such as channel quality) in another zone. This can allow the BS to compare the indicators for channel quality in the first zone and in the other zone and potentially to instruct a switch into another zone (radio configuration adaptation). Equally, indicators can provide information as to alternative link adaptation information (MCS variants) that would be most suited to the MS in the other zone. Some transmission techniques which embodiments of the invention help the BS to select between may include: two or more frequency reuse modes; localized or distributed subchannelization; and different MIMO modes.

The characteristic indicators may be used in the first communications apparatus to assess transmission parameters and modify them as necessary. For example, the transmission parameters assessed and potentially modified may be selected from parameters assessing suitability of one or more of the alternative transmission techniques mentioned above.

The second communications apparatus may be operable to determine the characteristic indicators before sending them, for example from pilot signals. This determination may also be from transmitted data.

The first communications apparatus may define the characteristic indicators, for example in the single standing instruction. Additionally or alternatively, the characteristic indicators may select the characteristic indicators in each interleaving pattern from a set of predefined characteristic indicators.

The second communications apparatus may send the interleaved characteristic indicators for a certain period of time or until the standing instruction is superseded. For example, a further standing instruction may be issued or a superseding instruction. In cases where the second communications apparatus is moving or a call is terminated, the superseding instruction may not be specifically related to the characteristic indicator but instead demonstrate a change of state for the second communications apparatus or its status.

By providing a plurality of different characteristic indicators, the first communications apparatus (e.g. a BS) is able to control a switch to a preferred transmission technique because the BS has approximately concurrent access to a CQI giving a report for each technique. For example, this can help the BS to choose between:

Reuse1/Reuse3 (FFR)
Localized/Distributed Subchannelization (AMC/PUSC)
Adaptive MIMO Switching (AMS)
  MIMO-A/MIMO-B (STC/SM)
  SU-MIMO/MU-MIMO (Single-user MIMO/Multi-user MIMO).

Embodiments of the invention facilitate the use of a combination of transmission techniques to maximize system benefits. For example (and as a non-exhaustive list of suggestions) the following techniques may be combined:

FFR with Localized/Distributed sub-channelization
FFR with AMS
AMS with Localized/Distributed sub-channelization
FFR with MU-MIMO.

There are many more possible configurations.

A feedback channel may be any channel which allows the second communications apparatus to send the characteristic indicators to the first communications apparatus. In one example, the feedback channel is a CQICH, e.g. CQICH Channel 1 or Channel 2 of the IEEE 802.16e-2005 standard. By "single" feedback channel it is meant that only one feedback channel is to be interleaved with the characteristic indicators, e.g. CQICH Channel 1 or CQICH Channel 2, but not both. The feedback channel may be allocated to the second communications apparatus, for example by the first communications apparatus. The allocation may be performed by way of an information element, e.g. a CQICH_Alloc_IE, for example as part of the UL-MAP. The feedback channel may be identified for example by a CQICH_ID.

The single standing instruction may set out all the details necessary to account for changes in channel conditions, and may comprise an information element, for example a CQICH_Alloc_IE. The first communications apparatus may transmit the standing instruction in a downlink frame/subframe (e.g. as part of the UL-MAP), instructing the second communications apparatus to send the characteristic indicators in subsequent uplink frames. In a specific example, the UL_MAP can include an IE (Information Element) which acts as a standing instruction to the MS to transmit the characteristic indicators in subsequent uplink frames/subframes in the fast feedback (CQICH) region of the uplink frames/subframes. The single standing instruction may specify which interleaving pattern is to be used initially by the second communications apparatus.

The first communications apparatus may also transmit to the second communications apparatus a specification of a feedback window, including a feedback timing and a feedback frequency range within a communication frame/subframe. The specification of the feedback window may be transmitted at the same time as the single standing instruction and as part of the single standing instruction or it may be transmitted separately. Not all communication frames/subframes in a sequence of communication frames/subframes may be allocated a feedback window for the second communications apparatus. For example, every other, every fourth, or every eighth uplink frame/subframe may include such an indicator and the resource occupied by the feedback window may otherwise be used for a feedback window for another second communications apparatus. The first communications apparatus may instruct the interval at which the communication frame/subframe includes the feedback window. To achieve this, the standing instruction could simply indicate the periodicity of the characteristic indicator in terms of the frame/subframe interval between indicators. The feedback window may accommodate a single characteristic indicator only. This feedback window can provide as many characteristic indicators as required by interchanging between providing these different indicators, so that a single feedback window only is allocated to the MS (second communications apparatus). Thus only one feedback window (or slot in the WiMAX example) need be allocated to each MS. Two feedback windows may be provided per second communications apparatus (MS), each of these feedback windows having interchanging characteristic indicators. For example, each feedback window could be a slot in a WiMAX frame allocated to the second communications apparatus in question, where each slot accommodates two channel quality indicators by alternating between these indicators in the communication frames which include the feedback window. Of course, other suitable interleaving patterns will be possible, depending on the system requirements.

The interleaving pattern may define when each characteristic indicator should be sent in relation to the other characteristic indicators in the pattern, and may define a pattern of regularity of the characteristic indicators which are to be sent. In a simple example, two characteristic indicators may be sent in alternate slots. In another example, one characteristic indicator may be sent at predetermined intervals, for example every fourth slot. Another characteristic indicator may fill the gaps between the characteristic indicators sent at predetermined intervals. In a further example, one characteristic indicator may leave free slots at predetermined intervals, for example every fourth slot, with one or more further characteristic indicators alternately filling the free slots. In a further example, the interleaving pattern may specify simply that one characteristic indicator should be sent more frequently than one or more other characteristic indicators. The at least two interleaving patterns may differ from each other in terms of the characteristic indicators which they comprise, and/or in terms of how frequently each characteristic indicator is to be sent, and/or in terms of the pattern according to which the characteristic indicators are to be sent.

The selection signal may comprise a trigger signal, and may comprise an information element, for example a Mode_Switch_IE. The method may comprise the first communications apparatus transmitting a selection signal as defined in the single standing instruction to the second communications apparatus. The first communications apparatus may determine and transmit the selection signal in response to a change in network conditions, requiring a change from a first radio configuration to a second radio configuration, e.g. from zone R1 to R3. The first communications apparatus may determine the selection signal to select an interleaving pattern appropriate for the second radio configuration. The first communications apparatus (e.g. a BS) may decide to initiate a change in the interleaving pattern based on the long-term change in the radio environment experienced by the second communications apparatus (e.g. a MS) and implied to the BS by means of one or more "slave" CQI reports as well as "master" reports. Information about the MS's channel condition in an alternate radio environment may be carried by the (infrequent) slave CQI reports. However, the processes by which the first communications apparatus decides that a change in interleaving is pattern is necessary are outside the scope of this discussion.

The first communications apparatus may comprise control circuitry configured to decide for each second communications apparatus which of a plurality of different characteristic indicators are to be transmitted and to decide for each second communications apparatus an interleaving pattern of transmission of the different characteristic indicators.

According to a second aspect, there is provided a method of transmitting a plurality of different characteristic indicators from a second communications apparatus to a first communications apparatus in a wireless communications network comprising the first communications apparatus and a plurality of such second communications apparatuses which communicate with the first communications apparatus, the method comprising;

the second communications apparatus receiving a single standing instruction from the first communications apparatus defining at least two interleaving patterns, each interleaving pattern specifying two or more of the characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns; and the second communications apparatus transmitting characteristic indicators to the first communications apparatus according to the single standing instruction.

The method may comprise the second communications apparatus receiving a selection signal as defined in the single standing instruction from the first communications apparatus and selecting an interleaving pattern according to the received selection signal.

According to a third aspect, there is provided a method of providing a first communications apparatus with a plurality of different characteristic indicators from a second communications apparatus in a wireless communications network comprising the first communications apparatus and a plurality of such second communications apparatuses which communicate with the first communications apparatus, the method comprising;

the first communications apparatus transmitting a single standing instruction to the second communications apparatus defining at least two interleaving patterns, each interleaving pattern specifying two or more of the characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns;

the second communications apparatus receiving the single standing instruction from the first communications apparatus; and the second communications apparatus transmitting characteristic indicators to the first communications apparatus according to the single standing instruction.

In any aspect, the single standing instruction may define first and second interleaving patterns, the first interleaving pattern specifying a said characteristic indicator which is to serve as a master characteristic indicator and one or more further said characteristic indicators which are to serve as slave characteristic indicators, and defining a pattern according to which the second communications apparatus is to interleave the master characteristic indicator and the one or more slave characteristic indicators in the single feedback channel, the second interleaving pattern specifying the same characteristic indicators as the first interleaving arrangement, with one of the further characteristic indicators to serve as a master indicator, and the remaining specified characteristic indicators to serve as slave characteristic indicators, and defining a pattern according to which the second communications apparatus is to interleave the master characteristic indicator and the slave characteristic indicators in the single feedback channel.

The selection signal may comprise a trigger signal in response to which the second communications apparatus is to toggle between interleaving patterns.

The method of any aspect may comprise the second communications apparatus toggling between interleaving patterns in response to receiving the trigger signal.

The trigger may come from the first communications apparatus (e.g. the BS) based mainly on alternate (slave) CQI reports. While the second communications apparatus (e.g. an MS) may make a request (using some signaling) indicating its preferred mode of operation, the final decision to issue the trigger may rest with the BS.

According to a fourth aspect, there is provided a first communications apparatus for use in a wireless communications network comprising the first communications apparatus and a plurality of second communications apparatuses which communicate with the first communications apparatus, the first communications apparatus comprising transmission circuitry configured to transmit a single standing instruction to the second communications apparatus defining at least two interleaving patterns, each interleaving pattern specifying two or more characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns.

The transmission circuitry may be configured to transmit a selection signal as defined in the single standing instruction to the second communications apparatus.

According to a fifth aspect, there is provided a second communications apparatus for use in a wireless communications network comprising a first communications apparatus and a plurality of such second communications apparatuses which communicate with the first communications apparatus, the second communications apparatus comprising receiving circuitry configured to receive a single standing instruction from the first communications apparatus defining at least two interleaving patterns, each interleaving pattern specifying two or more of the characteristic indicators and defining a pattern according to which the second communications apparatus is to interleave the specified characteristic indicators in a single feedback channel allocated to the second communications apparatus, the single standing instruction further defining a selection signal to be transmitted from the first communications apparatus to the second communications apparatus according to which the second communications apparatus is to select one of the interleaving patterns; and transmission circuitry configured to transmit characteristic indicators to the first communications apparatus according to the single standing instruction.

The receiving circuitry may be configured to receive a selection signal as defined in the single standing instruction from the first communications apparatus, and wherein the transmission circuitry is configured to select an interleaving pattern according to the received selection signal.

Further circuitry of the first or second communications apparatus can be provided to carry out any of the appropriate elements of the described methods.

In any of the above aspects, the various features may be implemented in hardware, or as software modules running on one or more processors or as a mixture of software and hardware. References to circuitry are therefore to be interpreted broadly.

According to a sixth aspect, there is provided a computer program which, when run on a computer, causes the computer to perform the method of any of the first to third aspects, or to become the apparatus of the fourth or fifth aspect, the computer program optionally being carried by a carrier medium, wherein the carrier medium is preferably a recording medium or a transmission medium.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

Embodiments of the invention relate to a signaling mechanism for a wireless communications system.

Figure 10:
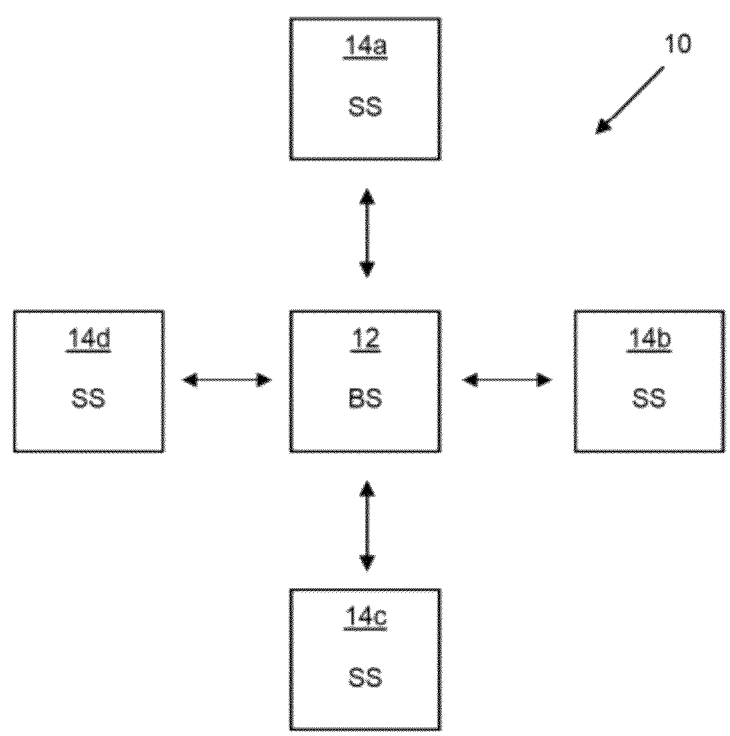
FIG. 10 is a block diagram of a wireless communications network.

FIG. 10 shows a wireless communications network 10 comprising a first communications apparatus, which in this example is a base station 12, and a plurality of second communications apparatuses, which in this example are subscriber stations 14, labelled 14a-d. The base station 12 and the subscriber stations 14 are configured to communicate wirelessly with one another. In this example, the wireless communications network is a WiMAX network, based on the IEEE 802.16 standards.

Figure 11:
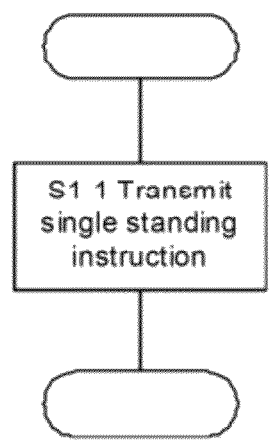
FIG. 11 is a flowchart representing an example of a method of requesting a plurality of different characteristic indicators.

FIG. 11 is a flowchart representing an example of a method of requesting a plurality of different characteristic indicators from one of the subscriber stations 14 in the wireless communications network 10.

Block S1-1 represents the base station 12 transmitting a single standing instruction to the subscriber station 14 defining at least two interleaving patterns, each interleaving pattern specifying two or more of the characteristic indicators and defining a pattern according to which the subscriber station 14 is to interleave the specified characteristic indicators in a single feedback channel allocated to the subscriber station 14. The single standing instruction further defines a selection signal to be transmitted from the base station 12 to the subscriber station 14, according to which the subscriber station 14 is to select one of the interleaving patterns.

Figure 12:
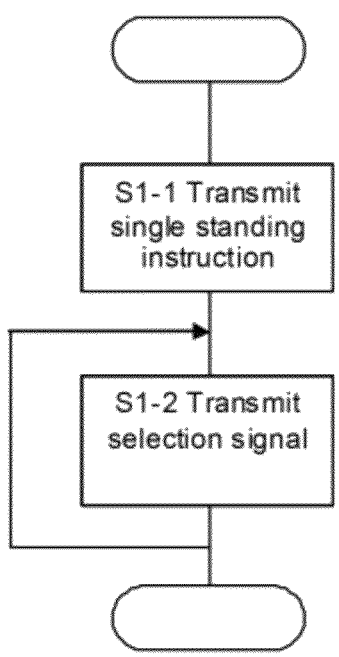
FIG. 12 is a flowchart representing another example of a method of requesting a plurality of different characteristic indicators.

FIG. 12 is a flowchart representing another example of a method of requesting a plurality of different characteristic indicators from one of the subscriber stations 14 in the wireless communications network 10.

Block S1-1 represents the base station 12 transmitting the single standing instruction to the subscriber station 14 as described above. Block S1-2 represents the base station 12 transmitting a selection signal as defined in the single standing instruction to the subscriber station 14. The base station 12 may repeat the actions of block S1-2 as necessary, based on changes in the radio environment.

Figure 13:
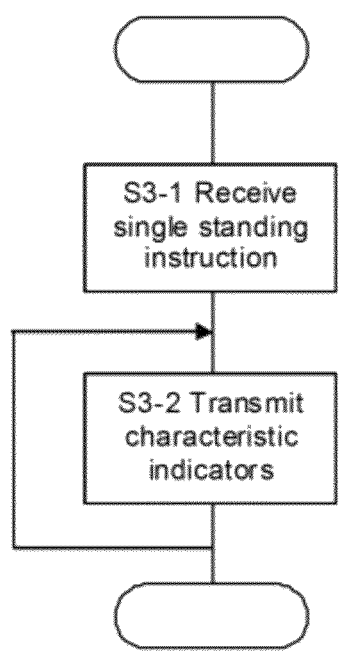
FIG. 13 is a flowchart representing an example of a method of transmitting a plurality of different characteristic indicators.

FIG. 13 is a flowchart representing an example of a method of transmitting a plurality of different characteristic indicators from one of the subscriber stations 14 to the base station 12 in the wireless communications network 10.

Block S3-1 represents the subscriber station 14 receiving the single standing instruction as described above from the base station 12. Block S3-2 represents the subscriber station 14 transmitting characteristic indicators to the base station 12 according to the single standing instruction. The subscriber station 14 may repeat the actions of block S3-2 as necessary, or as set out in the standing instruction.

Figure 14:
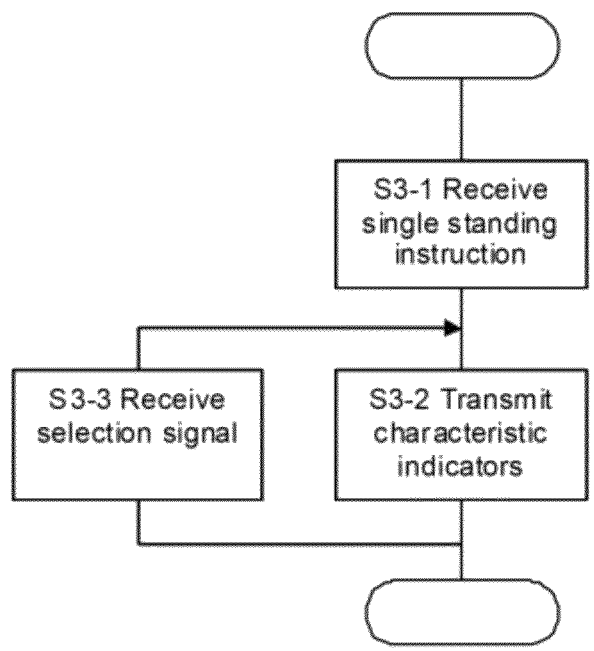
FIG. 14 is a flowchart representing another example of a method of transmitting a plurality of different characteristic indicators.

FIG. 14 is a flowchart representing another example of a method of transmitting a plurality of different characteristic indicators from one of the subscriber stations 14 to the base station 12 in the wireless communications network 10.

Block S3-1 represents the subscriber station 14 receiving the single standing instruction as described above from the base station 12, and block S3-2 represents the subscriber station 14 transmitting characteristic indicators to the base station 12 according to the single standing instruction. Block S3-3 represents the subscriber station 14 receiving a selection signal as defined in the single standing instruction from the base station 12 and selecting an interleaving pattern according to the received selection signal. The loop in FIG. 14 indicates that one or both of blocks S3-2 and S3-3 may be repeated as appropriate.

Figure 15:
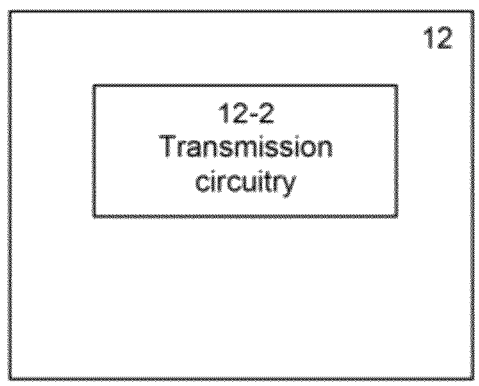
FIG. 15 is a block diagram of a base station.
Figure 16:
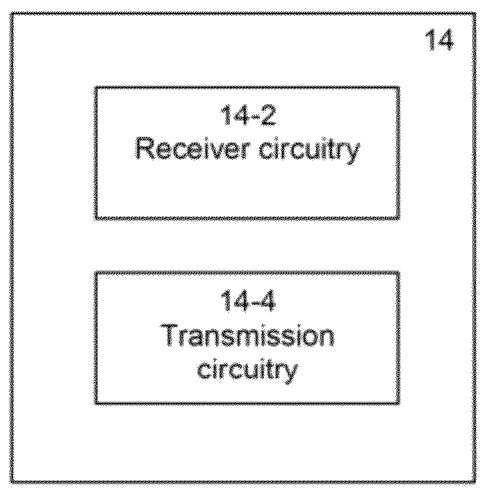
FIG. 16 is a block diagram of a subscriber station.

FIGS. 15 and 16 are block diagrams respectively of the base station 12 and one of the subscriber stations 14, showing only elements which are relevant to the description of the invention. The base station 12 includes transmission circuitry 12-2, and the subscriber station 14 includes receiver circuitry 14-2 and transmission circuitry 14-4. The circuitry shown in FIGS. 15 and 16 is configured to undertake the actions described herein.

The invention provides a signaling mechanism for the IEEE802.16m system where the BS 12 can instruct an MS 14 to report multiple CQI measurement reports with different intervals on the same CQICH channel. This includes instruction by the BS 12 to the MS 14 to initialise the status tag of each CQICH report as "Master" or "Slave" and providing the trigger information to change the tag and hence the reporting interval automatically at the MS 14. The BS 12 can achieve this by means of issuing a single CQICH_Alloc_IE or a similar type message and thereafter the MS 14 starts reporting accordingly and automatically updating the report feedback interval with the changing physical layer operating mode. This may be beneficial when the same type of report is not needed at every CQICH opportunity. In this case, the CQICH channel can be used in an optimal manner wherein the report type available to the BS 12 is in most instances the one required for link adaptation while at the same time maintaining regular feedback of other reports that the BS 12 may find useful in efficiently managing the radio resources, thus leading to an improved system performance.

As mentioned, the invention provides a CQICH signaling mechanism that allows the BS 12 to instruct the MS 14 to alternatively report a number of different measurements on the same CQICH channel and at the same time adapt the rate of these multiple reports as appropriate to the current radio configuration. In this case, radio configuration is defined as the physical layer operating mode of the MS 14, whether it be, for example, MIMO A, MIMO B, Re-use-1, Re-use-3, and Localized or Distributed sub-channelization. The signaling mechanism allows the BS 12 to collect the desired information with respect to the current or long-term channel conditions of the MS 14, allowing efficient management of resources without unnecessarily increasing the signaling and uplink CQICH channel overhead.

The invention may solve the problems outlined above without increasing the required signaling and system complexity. In general, the change in radio configuration (operating mode) happens due to long-term changes in the channel conditions of the MS 14, while the link adaptation is based on short-term changes in the channel. Only the report corresponding to the current operating mode may be required at a fast rate while other reports may arrive at longer, staggered intervals. The required measurements can be accommodated on a single CQICH channel by:

Defining a default Master CQICH Report corresponding to the current physical layer operating mode; which may be fed back from the MS 14 at a faster rate.

Defining optional Slave CQICH Reports required for configuration adaptation and switching, which may be fed back from the MS 14 at a slower rate.

Defining the Trigger that allows for the Master⇋Slave toggle so that, when the preferred radio configuration changes at the MS 14, the Master Report changes accordingly.

Defining the Slave_Feedback_Cycle that indicates how often the Slave Reports are time-interleaved between Master Reports.

Letting the MS 14 interleave and alternate the Slave Reports in between the Master Reports as per the defined Slave_Feedback_Cycle.

Incorporating an ARQ mechanism within the process to add to the robustness.

Thus, the BS 12 can be provided with the information to effectively assign the MSs 14 to either R1 or R3 zones. Moreover, the BS 12 also has the desired information to accurately assign an appropriate MCS (Modulation and coding scheme) for the specific zone in which the MS 14 has been allocated data. For instance, when the BS 12 decides to change the physical layer operating mode of a particular MS 14, it will have prior knowledge of the radio characteristics that the MS 14 experiences under the different modes of operation. Further, the status and rate of the required report for Link Adaptation is automatically updated whenever the MS 14 is allocated data using a new mode of operation (where the mode is chosen by the BS 12).

A message CQICH_Alloc_IE is defined to ensure that, during the allocation stage, the information mentioned above is captured in the message so that, once initialised, it need not be re-allocated for a given MS 14, irrespective of how the channel condition of the MS 14 changes. The generation of the CQICH_Alloc_IE by the BS 12 is illustrated by the flowcharts in FIG. 4, FIG. 5 and FIG. 6 and their respective descriptions below. The BS 12 may indicate the change in operating mode to the MS 14 by means of a Mode_Change signaling message (for example a Mode_Switch_IE) or it may be implicit depending on how a resource-block has been allocated to a given MS 14 in the DL. As an example of implicit signaling, the BS 12 may have pre-defined and mutually-exclusive zones within the DL region of the frame/superframe for multiple physical layer modes of operation. In such a case, depending on which zone the MS 14 has been allocated in, the MS 14 may implicitly adopt an interleaving pattern corresponding to the physical mode of operation of that zone provided that the "Zone-Type" or "Zone_Switch_IE" (which may be part of the DL-MAP) is defined as the trigger in the CQICH_Alloc_IE. In order to aid synchronization between the MS 14 and the BS 12, ACK-NACK signaling may be used for both the initial CQICH_Alloc_IE as well as for the implied or explicit trigger.

Figure 1:
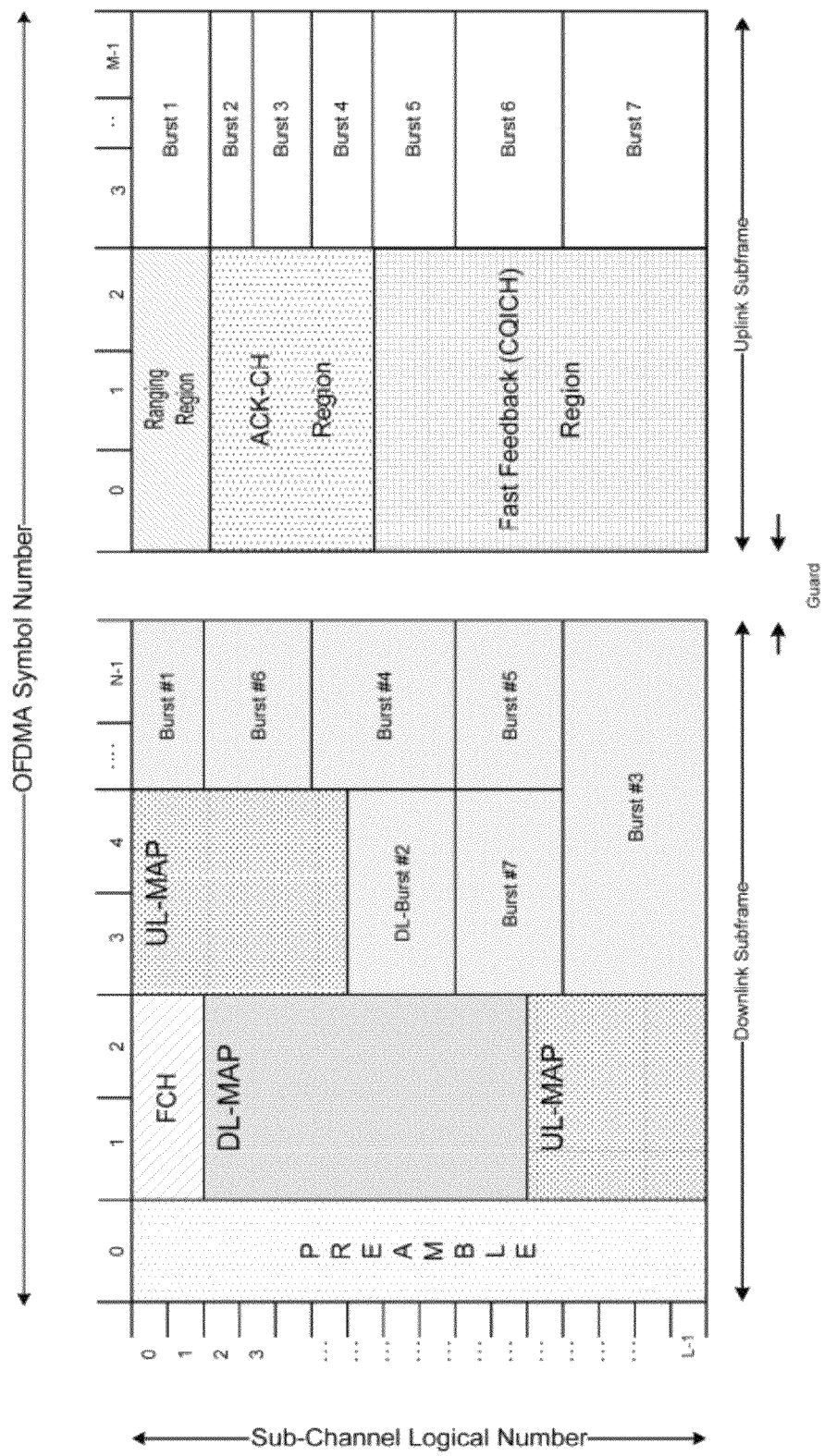
FIG. 1 shows a TDD OFDMA frame structure according to the IEEE 802.16e-2005 standard.
Figure 2:
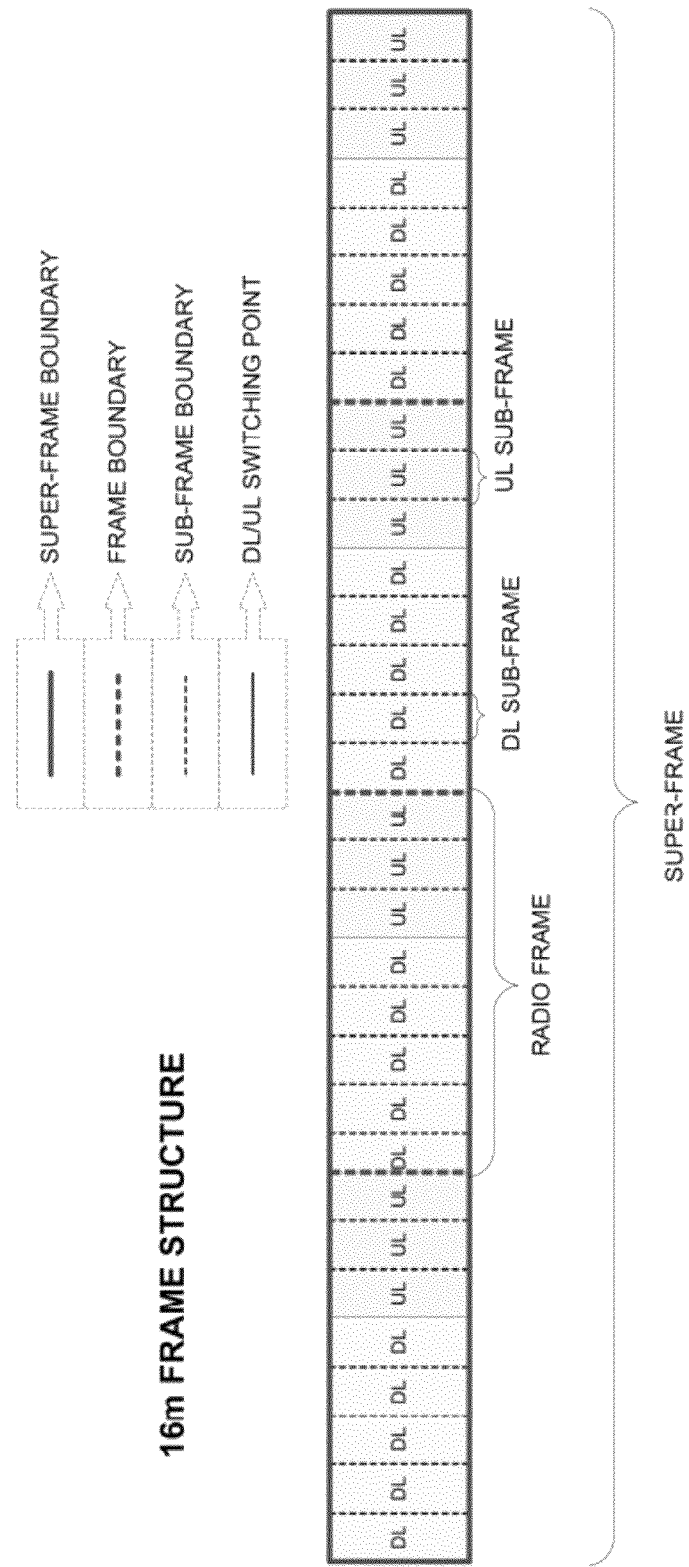
FIG. 2 shows the proposed TDD OFDMA super-frame structure according to the IEEE 802.16m standard.
Figure 3:
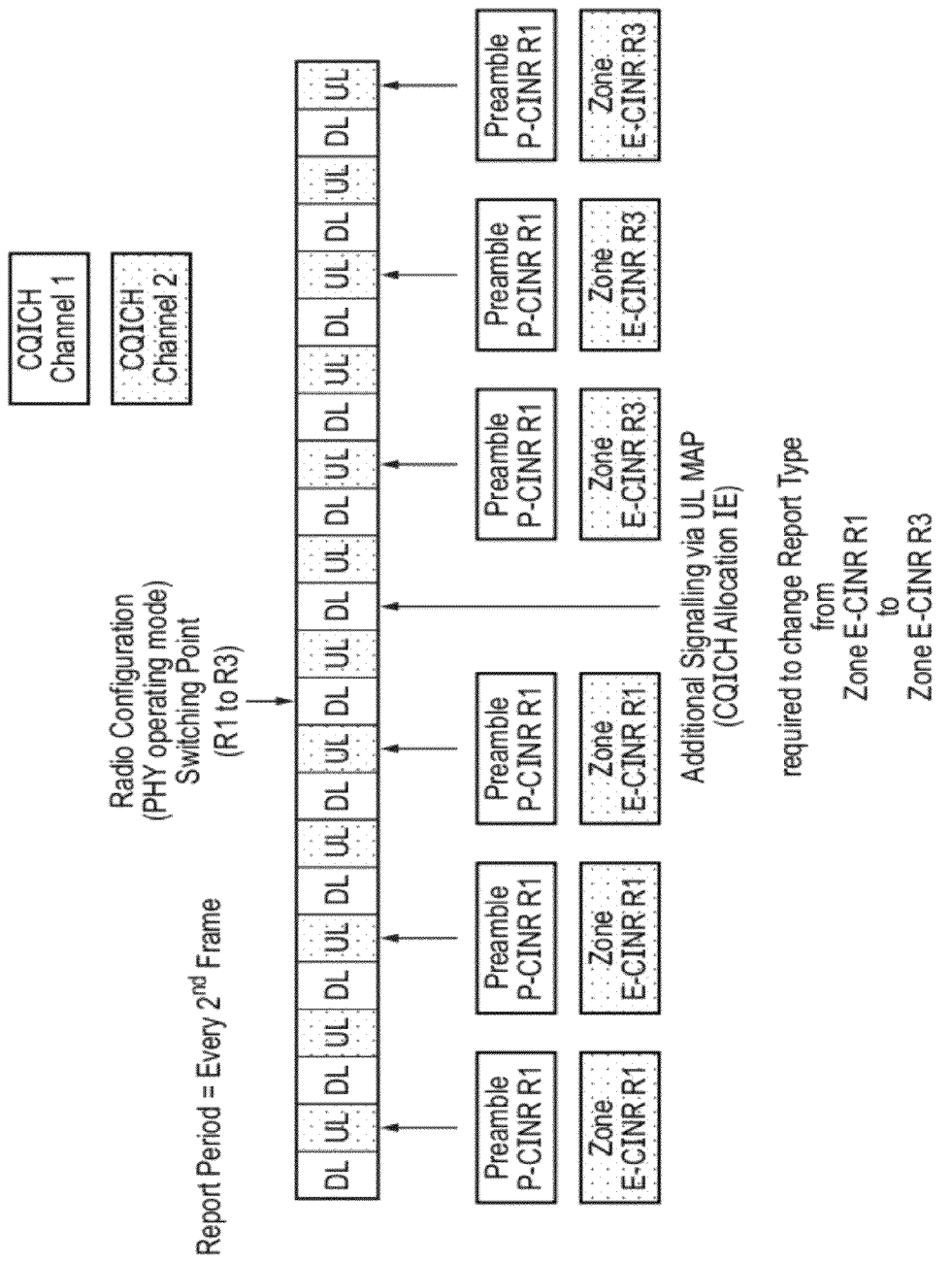
FIG. 3 illustrates an example of the sending of CQI reports according to the IEEE 802.16e-2005 standard.
Figure 4:
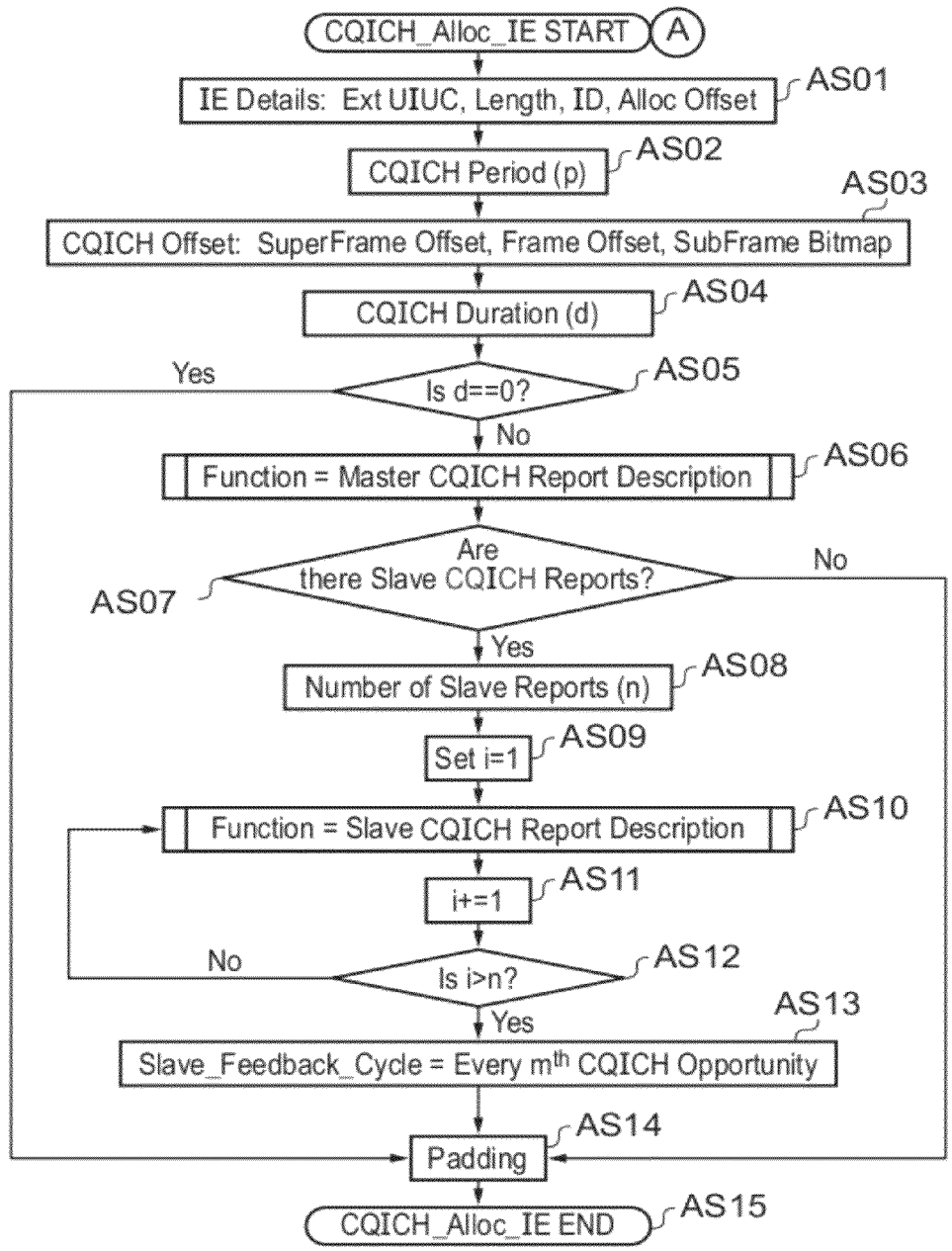
FIG. 4 is a flowchart representing the definition of an example of a CQICH_Alloc_IE.

FIG. 4 is a flowchart representing the definition of an example of a CQICH_Alloc_IE for the signaling mechanism, and the processes shown in the flowchart will now be described.

(AS01) Define IE details including Ext UIUC, Length, ID, and Allocation Offset.

(AS02) Define CQICH Period 'p' in terms of number of frames.

(AS03) Define CQICH Offset for 1$^{st}$ CQICH Report in terms of Superframe Offset, Frame Offset and Subframe Bitmap.

(AS04) Define CQICH Duration 'd' for which the CQICH_Alloc_IE is valid.

(AS05) If d==0 (implies CQICH_Alloc_IE is de-allocated), go to AS14.

(AS06) Provide "Master CQICH Report Description" (described with reference to FIG. 5).

(AS07) If Slave Report not present, go to AS14.

(AS08) Define Number of Slave Reports 'n'.

(AS09) Set counter i=0.

(AS10) Provide "i$^{th}$ Slave CQICH Report Description" (described with reference to FIG. 6).

(AS11) Increment counter 'i'.

(AS12) If i<n, repeat Steps 10 through 11.

(AS13) Define 'Slave_Feedback_Cycle' in terms of 'm$^{th}$' CQICH Opportunity.

(AS14) Add padding bits if required.

(AS15) End of CQICH_Alloc_IE.

Figure 5:
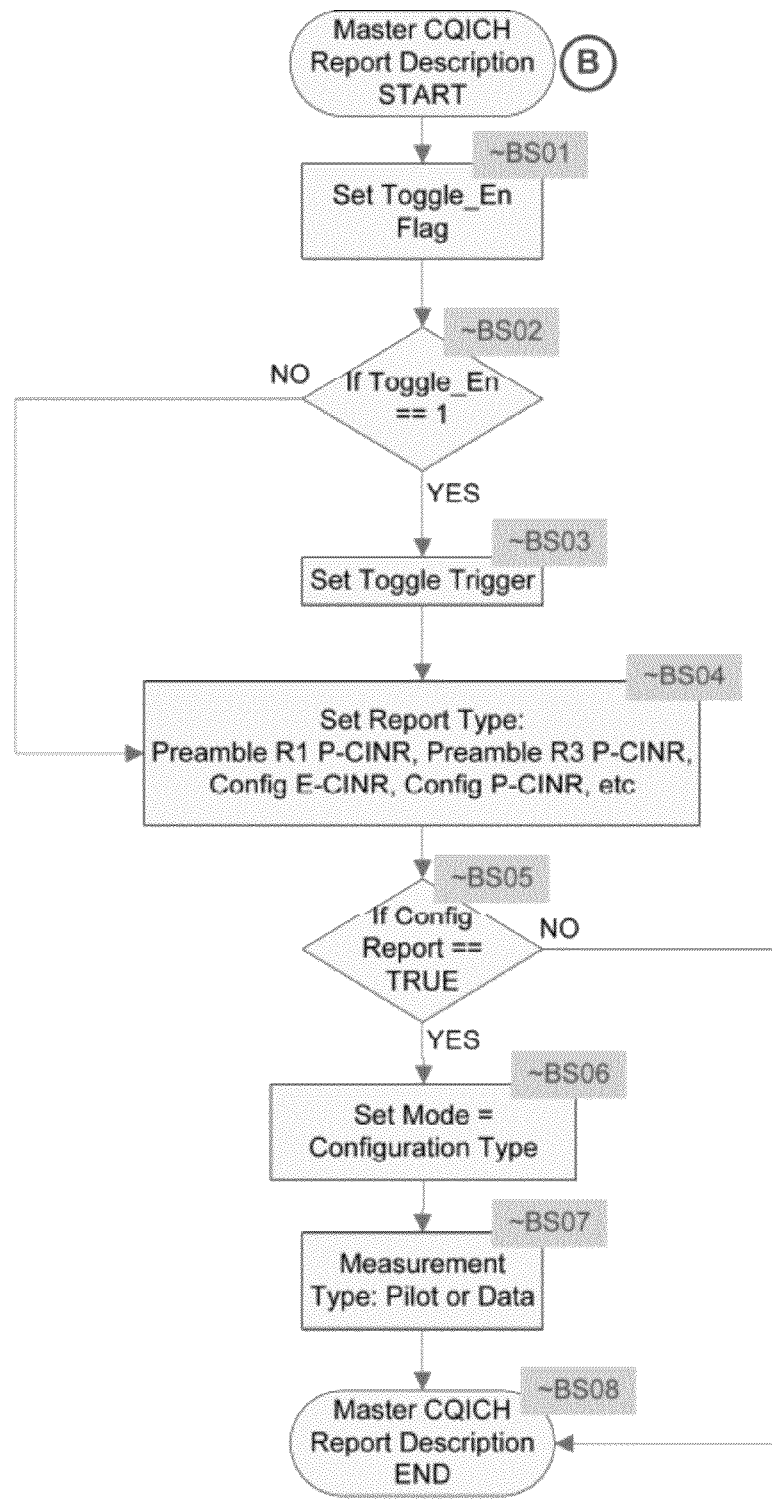
FIG. 5 is a flowchart representing the provision of a Master CQICH Report Description for the CQICH_Alloc_IE.

FIG. 5 is a flowchart representing the provision of a Master CQICH Report Description for the CQICH_Alloc_IE, as in AS06 of FIG. 4, and the processes shown in the flowchart will now be described.

(BS01) Set the flag 'Toggle_En' for the default Master CQICH Report. Value '1' implies that the role of the report may change to 'Slave' based on 'Toggle Trigger'. Value '0' implies that the report is always 'Master'.

(BS02) If Toggle_En==0, go to BS04.

(BS03) Set Toggle Trigger which defines when the status of the 'Master' report may be toggled to 'Slave'. E.g. A type of Mode_Change Signaling Message like Mode_Switch_IE.

(BS04) Set Report Type. This describes whether the report is expected for a given mode of operation (Config Report) or for Preamble (Preamble Report). It may or may not include further details like whether the measurement is based on Physical or Effective SINR and in case of Preamble Report, whether it is meant for Reuse 1 or Reuse 3 zone.

(BS05) If Report Type==Preamble Report, go to BS08.

(BS06) Set Mode which describes exactly the Physical layer mode of operation for which the CQICH report is expected.

(BS07) Set Measurement Type which indicates whether the measurement is carried out on Pilot or Data subcarriers.

(BS08) End of Master CQICH Report Description.

Figure 6:
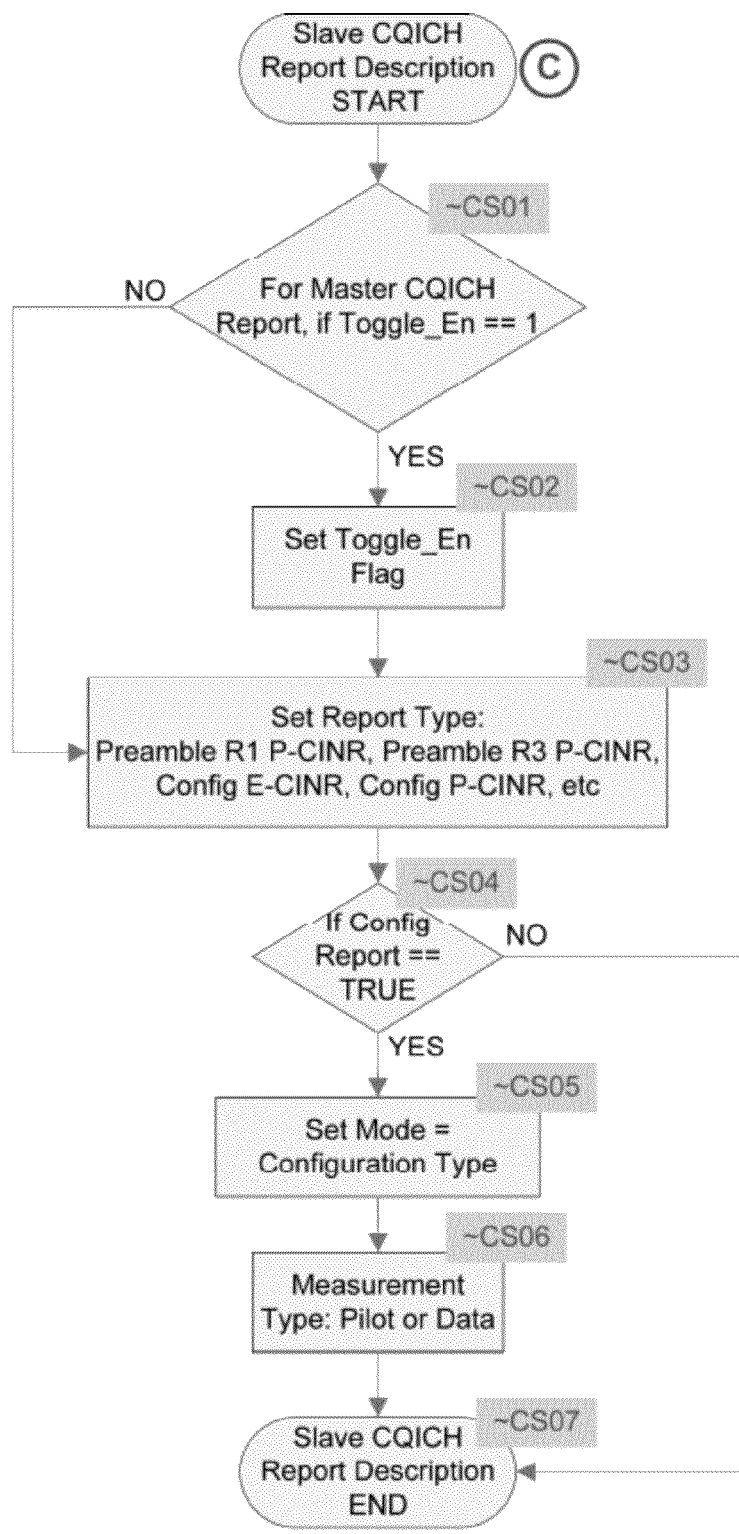
FIG. 6 is a flowchart representing the provision of a Slave CQICH Report Description for the CQICH_Alloc_IE.

FIG. 6 is a flowchart representing the provision of a Slave CQICH Report Description for the CQICH_Alloc_IE, as in AS10 of FIG. 4, and the processes shown in the flowchart will now be described.

(CS01) For Master CQICH Report, if Toggle_En==0, go to CS03.

(CS02) Set the flag 'Toggle_En' for the Slave CQICH Report. Value '1' implies that the role of the report may change to 'Master' based on 'Toggle Trigger' defined for Master CQICH Report. Value '0' implies that the report is always 'Slave'.

(CS03) Set Report Type. This describes whether the report is expected for a given mode of operation (Config Report) or for Preamble (Preamble Report). It may or may not include further details like whether the measurement is based on Physical or Effective SINR and in case of Preamble Report, whether it is meant for Reuse 1 or Reuse 3 zone.

(CS04) If Report Type==Preamble Report, go to CS07.

(CS05) Set Mode which describes exactly the Physical layer mode of operation for which the CQICH report is expected.

(CS06) Set Measurement Type which indicates whether the measurement is carried out on Pilot or Data subcarriers.

(CS07) End of Slave CQICH Report Description.

The MS decodes the CQICH_Alloc_IE, sends an acknowledgement either directly by means of message like Alloc_ACK or implicitly by sending an ACK for UL-MAP. The feedback mechanism at the MS 14 is then initiated which is as described with reference to the flowchart in FIG. 7. The subroutine describing the selection of the next report to be sent on the CQICH channel, as in DS12 of FIG. 7, is described with reference to the flowchart in FIG. 8.

Figure 7:
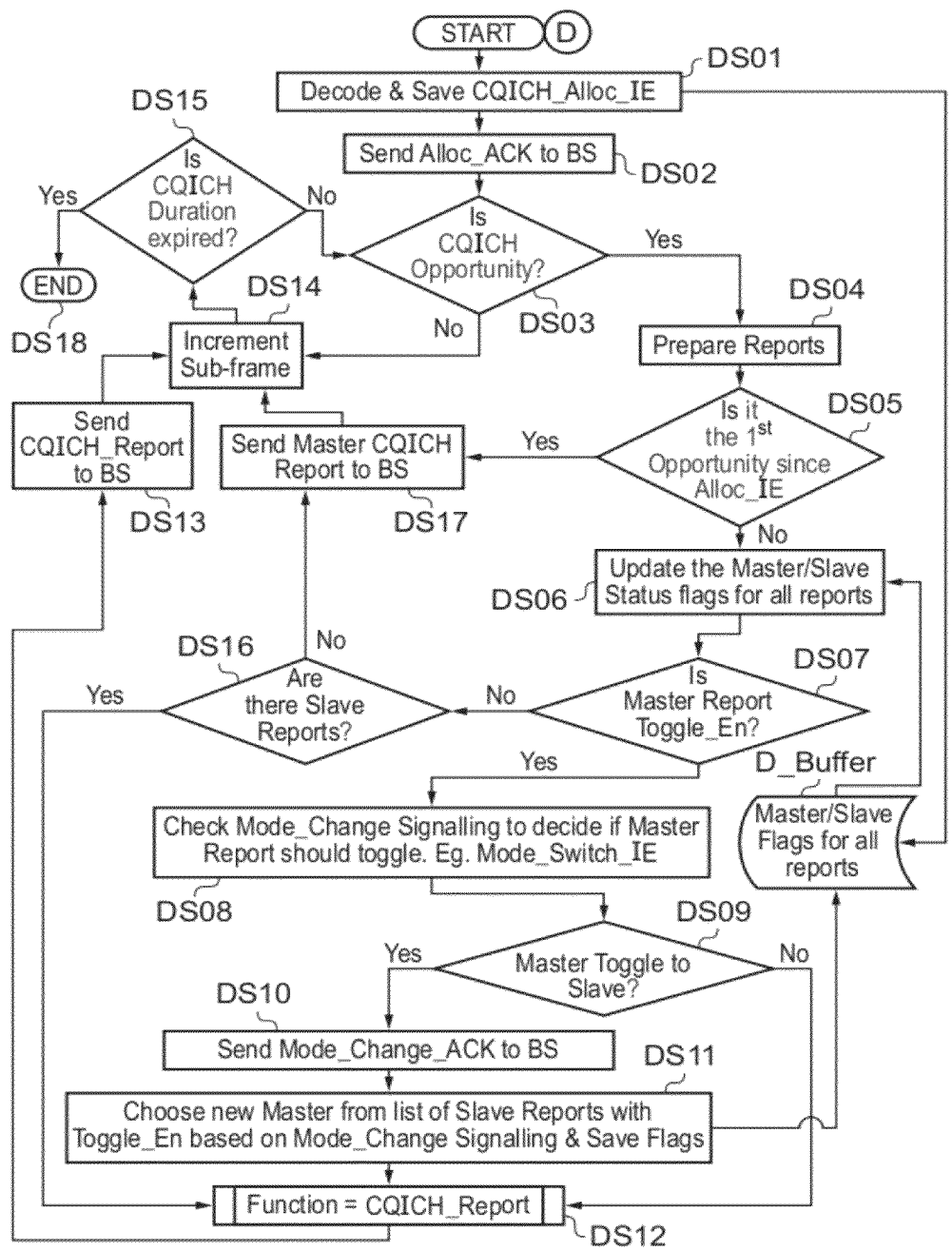
FIG. 7 is a flowchart representing a CQICH Feedback Mechanism.

FIG. 7 is a flowchart representing a CQICH Feedback Mechanism at the MS 14. The processes shown in the flowchart will now be described.

(DS01) Decode and save the received CQICH_Alloc_IE.

(DS02) Send acknowledgement to the BS, for e.g. a message like Alloc_ACK (or implicitly in form of UL-MAP_ACK).

(DS03) Check if this is a valid CQICH reporting opportunity. If not, go to DS14.

(DS04) Prepare CQICH Reports.

(DS05) Check if it's the first opportunity since CQICH_Alloc_IE was issued. If 'yes', go to DS17.

(DS06) Based on the Master/Slave Flags saved in the buffer, update the Master/Slave status of all CQICH reports.

(DS07) Check if the Toggle_En Flag of the Master CQICH Report is set to '1'. If not, go to DS16.

(DS08) Check the Mode_Change signaling to decide if the Master Report should toggle to Slave.

(DS09) If the status of Master should not be toggled to Slave, go to DS12.

(DS10) Send an acknowledgement to the BS confirming the change in operating mode by means of a message like Mode_Change_ACK.

(DS11) Choose new Master from the list of Slaves which have the flag Toggle_En set to '1'. Save these new status flags into the buffer which will be accessed for updating flags in DS06.

(DS12) Call the function CQICH_Report (described with reference to FIG. 8), which determines which among the available Master or multiple Slave reports should be fed back to the BS.

(DS13) Send the CQICH_Report to the BS 12.

(DS14) Increment the sub-frame.

(DS15) Check if CQICH_Duration has expired. If yes, go to DS18 (END). If not, go to DS03.

(DS16) Check if Slave report/s has/have been defined by the CQICH_Alloc_IE. If yes, go to DS12.

(DS17) Send Master CQICH Report to the BS 12 and go to DS14.

(DS18) END.

Figure 8:
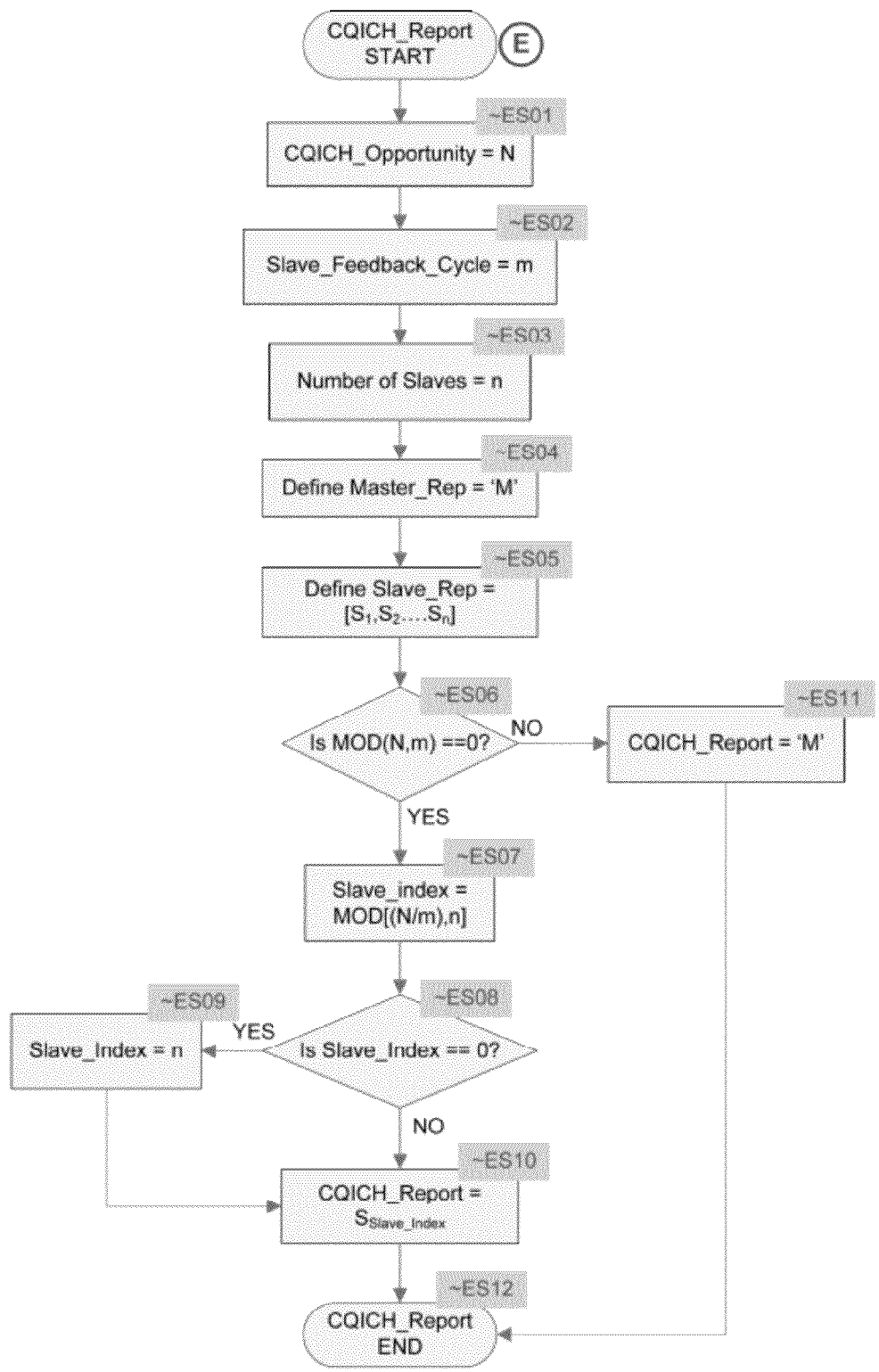
FIG. 8 is a flowchart representing the selection of the CQICH_Report required to be sent at the $N^{th}$ CQICH Opportunity.

FIG. 8 is a flowchart representing the selection of the CQICH_Report required to be sent at the N$^{th}$ CQICH Opportunity. The processes shown in the flowchart will now be described.

(ES01) Define N=CQICH_Opportunity (count).

(ES02) Define m=Slave_Feedback_Cycle.

(ES03) Define n=Number of Slaves.

(ES04) Define 'M'=Master Rep.

(ES05) Define $[S_1, S_2, \ldots S_n]$=n Slave_Rep.

(ES06) If MOD(N,m) !=0, go to ES11.

(ES07) Define Slave_Index=MOD[(N/m), n].

(ES08) If Slave_Index !=0, go to ES10.

(ES09) Slave_Index=n.

(ES10) Set CQICH_Rep=$S_{Slave\_index}$, go to ES12.

(ES11) CQICH_Rep='M'.

(ES12) END

When a Mode_Change signaling is detected at the MS 14, it sends an acknowledgement to the BS 12 either directly by a message similar to Mode_Change_ACK or implicitly by an ACK for UL-MAP. The ARQ process for the CQICH Feedback and Signaling mechanism helps avoid false triggers, helps in synchronization and thus adds to the robustness of the process.

In the FFR example and in the context of the 16m Frame Structure, the reports and intervals are defined as in Table 1, which may form part of the CQICH_Alloc_IE (or similar message).

TABLE 1

CQICH settings for FFR Example

| CQICH Period | | 1 Frame |
|---|---|---|
| Default Master | Report | E_CINR R1 |
| | Toggle Status | On |
| | Toggle Trigger | Mode_Switch_IE (or similar) |
| | Number of Slaves | 2 |
| Slave 1 | Report | E_CINR R3 |
| | Toggle_En | Yes |
| Slave 2 | Report | P_CINR R1 |
| | Toggle_En | No |
| | Slave_Feedback_Cycle | Every 4$^{th}$ CQICH Opportunity |

Figure 9:
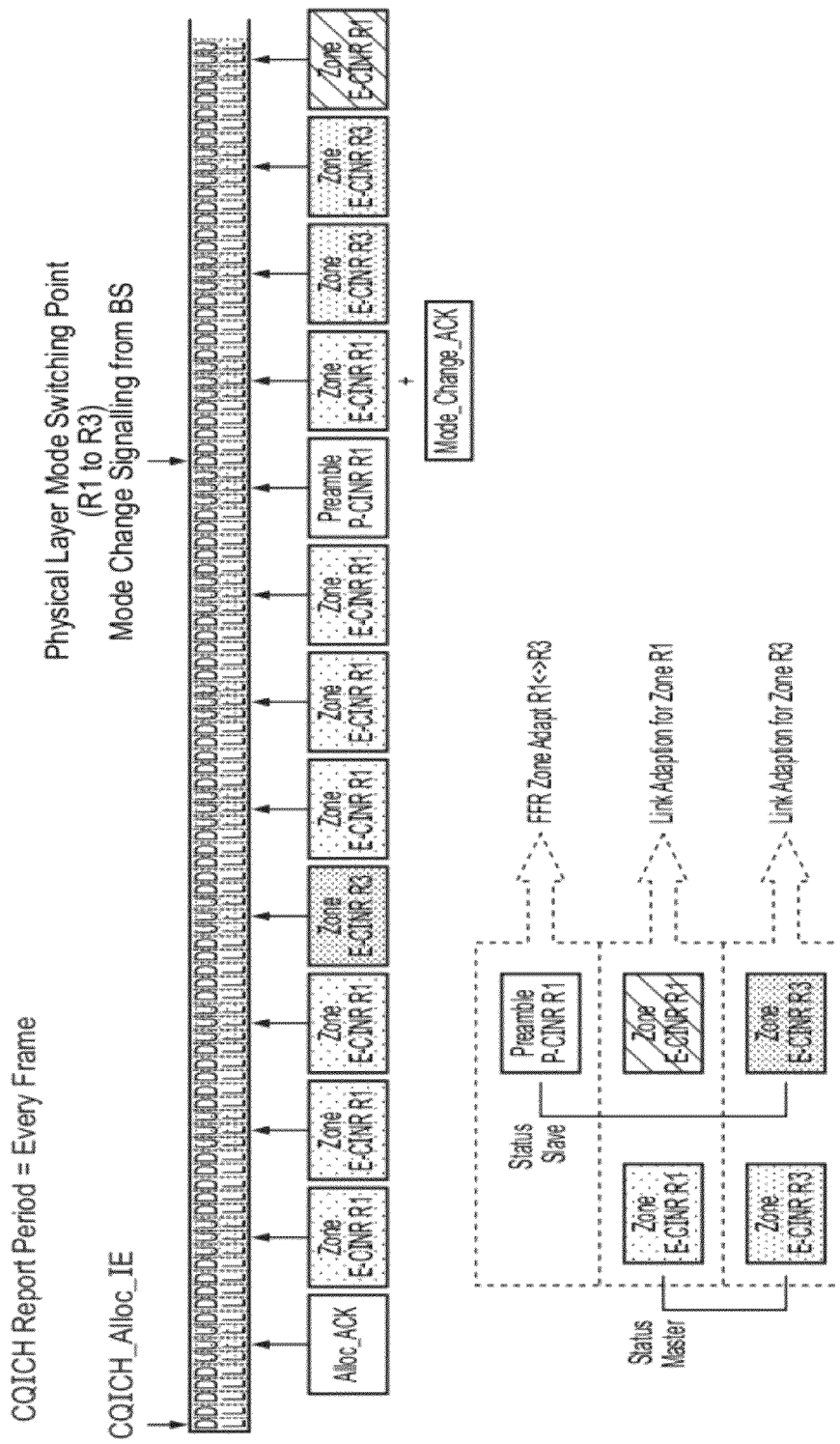
FIG. 9 is an illustration of CQICH signaling with rate adaptive interleaved reports in the 16m frame structure.

The timing diagram is illustrated in FIG. 9.

As can be seen, on the same CQICH channel, the Master report is fed back at a faster rate and the two Slave reports are time interleaved and alternated according to the Slave_Feedback_Cycle. Later, when the physical layer operation mode changes from R1 to R3, it is indicated by the BS 12 by means of an IE (Information Element) which indicates a change of physical layer mode or by a Mode_Switch_IE (or similar type message). This is used by the MS 14 to trigger the Master⇌Slave toggle, send an ACK for the trigger and accordingly update the Master and Slave flags of the feedback reports. The CQICH feedback operation is thus illustrated in FIGS. 7 to 9. The Feedback cycle continues in the default mode until a Mode_Change trigger is experienced by the MS 14, when the MS 14 sends an ACK for the trigger and updates the CQICH Feedback cycle from the next CQICH Opportunity.

Thus, the invention addresses the major limitations of the existing standard by providing an efficient signaling and feedback mechanism that makes optimum use of the available fast-feedback resources in the UL, which is particularly beneficial for TDD based systems without adding to any signaling overhead.

The invention can be applied to many other more complex configurations as wireless technology evolves and as standards are designed to take advantage of cutting edge concepts/techniques, therefore allowing the BS 12 to perform its radio resource management in the most robust manner possible with the ultimate goal of providing advanced user (MS 14) performance.

In current systems such as IEEE802.16e-2005, there is a limitation in the feedback mechanism that either leads to added overhead for signaling requests to change the report rate or type or to apply correction during link adaptation, thus reducing efficiency of the system and leading to non-optimum performance.

The invention addresses the need to adapt the periodicity of different CQI reports in a dynamic radio environment by proposing a signaling mechanism without adding to the signaling overhead and thus ensuring accurate link adaptation. The scheme categorizes multiple CQI reports on the same CQI channel as being "Master" or "Slave" depending on whether a given report is required for link adaptation, physical layer mode adaptation or for mode switching purposes. Further, the scheme provides a mechanism to switch the status of the report type from "Master" to "Slave" or vice-versa which is automatically triggered by a change in operating mode, thus maximizing system performance in an ever changing radio environment for both low and especially high mobility users.

Summary of benefits:
Supporting co-existence of fast and slow CQI reports on the same CQICH channel for a given user thus eliminating the need for multiple feedback channels or additional signaling overhead.
Providing means to set and automatically change the periodicity of CQI reports based on changing MS operating mode without any additional signaling overhead.
Ensuring increased reliability of CQI reports in a dynamic radio environment, thus leading to increased accuracy and reduced latency in link adaptation even for high mobility users.
Optimizing the use of radio resources in the control plane, hence improving the efficiency of the radio network.
Maximizing the throughput for a given user and hence the overall system by means of reliable link adaptation.
Enhancing radio network performance by enabling fast channel adaptation especially for high mobility users.
Providing an automated process for CQICH Signaling and Feedback mechanism leading to potential ease in implementation thus reducing system complexity.
Adding to the robustness of the scheme by incorporating ARQ mechanism.

In the above description, the second communications apparatus has been termed the MS, whereas the first communications apparatus has been referred to as the BS. However, this is not limiting, and the skilled reader will appreciate that the first apparatus may be an RS or other entity and that independently the second apparatus may be an RS or other entity.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of requesting a plurality of different characteristic indicators from a second communications apparatus in a wireless communications network comprising a first communications apparatus and a plurality of such second communications apparatuses which communicate with the first communications apparatus, the method comprising;
the first communications apparatus transmitting a single standing instruction to the second communications apparatus defining at least two interleaving patterns, each interleaving pattern specifying two of the characteristic indicators and defining a pattern according to which the second communications apparatus is to interleave the specified two characteristic indicators in a single feedback channel allocated to the second communications apparatus, the pattern indicating an interval between characteristic indicators and a number of transmissions of one of the two specified characteristic indicators between transmissions of the other of the two specified characteristic indicators, wherein the at least two interleaving patterns differ from each other in terms of how frequently each characteristic indicator is to be sent, the single standing instruction further defining a selection signal to be transmitted from the first communications apparatus to the second communications apparatus according to which the second communications apparatus is to select one of the interleaving patterns.

2. The method of claim 1, further comprising the first communications apparatus transmitting a selection signal as defined in the single standing instruction to the second communications apparatus.

3. A method of transmitting a plurality of different characteristic indicators from a second communications apparatus to a first communications apparatus in a wireless communications network comprising the first communications apparatus and a plurality of such second communications apparatuses which communicate with the first communications apparatus, the method comprising;

the second communications apparatus receiving a single standing instruction from the first communications apparatus defining at least two interleaving patterns, each interleaving pattern specifying two of the characteristic indicators and defining a pattern according to which the second communications apparatus is to interleave the specified two characteristic indicators in a single feedback channel allocated to the second communications apparatus, the pattern indicating an interval between characteristic indicators and a number of transmissions of one of the two specified characteristic indicators between transmissions of the other of the two specified characteristic indicators, wherein the at least two interleaving patterns differ from each other in terms of how frequently each characteristic indicator is to be sent, the single standing instruction further defining a selection signal to be transmitted from the first communications apparatus to the second communications apparatus according to which the second communications apparatus is to select one of the interleaving patterns; and the second communications apparatus transmitting characteristic indicators to the first communications apparatus according to the single standing instruction.

4. The method of claim 3, further comprising the second communications apparatus receiving a selection signal as defined in the single standing instruction from the first communications apparatus and selecting an interleaving pattern according to the received selection signal.

\* \* \* \* \*